US009184815B2

(12) United States Patent
Wang

(10) Patent No.: US 9,184,815 B2
(45) Date of Patent: Nov. 10, 2015

(54) SYSTEMS, METHODS, AND MEDIA FOR SELECTING ANTENNAS AND BEAMFORMERS

(75) Inventor: Xiaodong Wang, Ramsey, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/114,421

(22) PCT Filed: Apr. 30, 2012

(86) PCT No.: PCT/US2012/035899
§ 371 (c)(1),
(2), (4) Date: Oct. 28, 2013

(87) PCT Pub. No.: WO2012/149576
PCT Pub. Date: Nov. 1, 2012

(65) Prior Publication Data
US 2014/0056381 A1 Feb. 27, 2014

Related U.S. Application Data

(60) Provisional application No. 61/480,121, filed on Apr. 28, 2011.

(51) Int. Cl.
*H04L 27/00* (2006.01)
*H04B 7/04* (2006.01)
(Continued)

(52) U.S. Cl.
CPC ............ *H04B 7/0456* (2013.01); *H04B 7/0617* (2013.01); *H04B 7/0691* (2013.01);
(Continued)

(58) Field of Classification Search
CPC .. H04B 7/0456; H04B 7/0617; H04B 7/0619; H04B 7/0691; H04B 7/0848; H04B 7/0874; H04B 7/0417; H04B 7/0669; H04L 1/0003; H04L 1/0071; H04L 5/0007; H04L 1/0009; H04L 27/0008; H04L 1/0618; H04L 1/06; H04L 25/0204

USPC .................................................. 375/295, 267
See application file for complete search history.

(56) References Cited

U.S. PATENT DOCUMENTS

2008/0227498 A1* 9/2008 Kwon et al. ................ 455/562.1
2009/0296650 A1* 12/2009 Venturino et al. ............ 370/330

(Continued)

FOREIGN PATENT DOCUMENTS

WO WO/2007/021058 2/2007
WO WO/2009/053684 4/2009

OTHER PUBLICATIONS

"IEEE Standard for IT-Telecom & Info Exchange b/w Systems—Local & Metro Area Networks-Specific Req. Part 11: Wireless LAN Medium Access Control (MAC) & Physical Layer (PHY) Specs Amend. 3: Enhancements for Very High Throughput in the 60 GHz Band", IEEE Standard 802.11ad-2012, (month unknown) 2012, pp. 1-628.

(Continued)

*Primary Examiner* — Nader Bolourchi
(74) *Attorney, Agent, or Firm* — Byrne Poh LLP

(57) ABSTRACT

Systems that: (a) select a current antenna subset; (b) receive signals in response to a transmission of pilot symbols using the current antenna subset: (c) determine a current objective function for the current antenna subset; (d) replace an antenna in the current antenna subset with another antenna not, in the current antenna subset, to form a next antenna subset; (e) receive signals in response to a transmission of pilot symbols using the next antenna subset; (f) determines a next objective function for the current antenna subset; (g) determines whether the next objective function is better than the current objective function, and if so creates a corresponding next occupation probability vector entry; and (h) determines whether the value for the corresponding next occupation probability vector entry is larger than a value for an optimal occupation probability vector entry, and if so sets the second antenna subset as the optimal antenna subset.

15 Claims, 5 Drawing Sheets

(51) Int. Cl.
*H04B 7/06* (2006.01)
*H04B 7/08* (2006.01)

(52) U.S. Cl.
CPC ............ *H04B 7/0848* (2013.01); *H04B 7/0874* (2013.01); *H04B 7/0413* (2013.01); *H04B 7/061* (2013.01); *H04B 7/0634* (2013.01)

(56) References Cited

U.S. PATENT DOCUMENTS

2010/0266002 A1* 10/2010 Du et al. ................. 375/224
2011/0069774 A1   3/2011 Wang et al.

OTHER PUBLICATIONS

"IEEE Std for IT-Telecom & Info Exchange b/w Systems—Local & Metro Area Networks-Specific Req. Part 15.3: Wireless Medium Access Control (MAC) & Physical Layer (PHY) Specs for High Rate WPANS Amend. 2: Millimeter-Wave-Based Alt. Physical Layer Extension," In IEEE Std 802.15.3c-2009, Oct. 2009, pp. 1-203.

Banister, B.C. and Zeidler, J.R., "A Simple Gradient Sign Algorithm for Transmit Antenna Weight Adaptation with Feedback", In IEEE Transactions on Signal Processing, vol. 51, No. 5, May 2003, pp. 1156-1171.

Berenguer, I., et al., "Adaptive MIMO Antenna Selection via Discrete Stochastic Optimization", In IEEE Transactions on Signal Processing, vol. 53, No. 11, Nov. 2005, pp. 4315-4329.

Berenguer, I., et al., "Transmit Antenna Selection in Linear Receivers: Geometrical Approach", In Electronics Letters, vol. 40, No. 5, Mar. 4, 2004, pp. 292-293.

Choi, C., et al., "Beamforming Training for IEEE 802.11ad", doc. :IEEE 802.11-10/0496rl, May 2010, pp. 1-14.

Doan, C.H., et al., "Design Considerations for 60 GHz CMOS Radios", In IEEE Communications Magazine, vol. 42, No. 12, Dec. 2004, pp. 132-140.

Dong, K., et al., "Adaptive Antenna Selection and Tx/Rx Beamforming for Large-scale MIMO Systems in 60GHz Channels", In EURASIP Journal on Wireless Communications and Networking, vol. 2011, No. 59, Aug. 11, 2011, pp. 1-14.

Gharavi-Alkhansari, M. and Gershman, A.B., "Fast Antenna Subset Selection in MIMO Systems", In IEEE Transactions on Signal Processing, vol. 52, No. 2, Feb. 2004, pp. 339-347.

Gorokhov, A., et al., "Receive Antenna Selection for MIMO Flat-Fading Channels: Theory and Algorithms", In IEEE Transactions on Information Theory, vol. 49, No. 10, Oct. 2003, pp. 2687-2696.

International Patent Application No. PCT/US2009/032659, filed Jan. 30, 2009.

International Patent Application No. PCT/US2010/021917, filed Jan. 25, 2010.

International Preliminary Report on Patentability in International Patent Application No. PCT/US2012/035899, filed Apr. 30, 2012, mailed Nov. 7, 2013.

Maltsev, A., et al., "Channel Models for 60 GHz WLAN Systems", IEEE P802.11 Wireless LANS, doc.:IEEE 802.11-09/0334r8, May 2010, pp. 1-152.

Molisch, A.F., et al., "Capacity of MIMO Systems with Antenna Selection", In IEEE Transactions on Wireless Communications, vol. 4, No. 4, Jul. 2005, pp. 1759-1772.

Nsenga, J., et al., "Comparison of OQPSK and CPM for Communications at 60 GHz with a Nonideal Front End", In EURASIP Journal of Wireless Communications and Networking, vol. 2007, No. 1, Mar. 15, 2007, pp. 1-14.

Pan, Y-H., et al. "Adaptive Beamforming with Antenna Selection in MIMO Systems", In Vehicular Technology Conference (VTC '04), vol. 3, Sep. 2004, pp. 1570-1574.

Seyedi, A., et al., "On the Capacity of Wideband 60GHz Channels with Antenna Directionality," In Proceedings of IEEE Global Telecommunications Conference (GLOBECOM '07), Washinton D.C., USA, Nov. 26-30, 2007, pp. 4532-4536.

Supplementary European Search Report dated Aug. 19, 2014 in European Patent Application No. 12777758.9.

Wang, X., et al., "Stochastic Gradient Algorithms for Design of Minimum Error-Rate Linear Dispersion Codes in MIMO Wireless Systems", In IEEE Transactions on Signal Processing, vol. 54, No. 4, Apr. 2006, pp. 1242-1255.

Yong, S.K. and Chong, C.-C., "An Overview of Multigigabit Wireless through Millimeter Wave Technology: Potentials and Technical Challenges", In EURASIP Journal of Wireless Communications & Networking, Dec. 10, 2006, pp. 1-10.

\* cited by examiner

SYSTEMS, METHODS, AND MEDIA FOR SELECTING ANTENNAS AND BEAMFORMERS

CROSS REFERENCE TO RELATED APPLICATION

The application claims the benefit of U.S. Provisional Patent Application No. 61/480,121, filed Apr. 28, 2011, which is hereby incorporated by reference herein in its entirety.

TECHNICAL FIELD

Systems, methods, and media for selecting antennas and beamformers are provided.

BACKGROUND

Certain high giga-Hertz communications techniques, such as 60 GHz millimeter wave communications, have received significant recent attention and are considered as promising technologies for short-range broadband wireless transmission with data rates up to multi-giga bits/sec. Wireless communications at such frequencies can possess several advantages including a huge clean unlicensed bandwidth (up to 7 GHz), a compact size of transceiver due to the short wavelength, and less interference brought by high atmospheric absorption. Standardization activities have been ongoing for 60 GHz Wireless Personal Area Networks (WPAN) (i.e., IEEE 802.15) and Wireless Local Area Networks (WLAN) (i.e., IEEE 802.11). The key physical-layer characteristics of this system include a large-scale MIMO system (e.g., 32×32) and the use of both transmit and receive beamforming techniques.

To reduce hardware complexity, typically the number of radio-frequency (RF) chains (which can include amplifiers, AD/DA converters, mixers, etc.) employed is smaller than the number of antenna elements, and an antenna selection technique is used to fully exploit the beamforming gain afforded by the large-scale MIMO antennas. Although various schemes for antenna selection exist in the literature, they all assume that the MIMO channel matrix is known or can be estimated. In some such systems, however, the receiver may have no access to such a channel matrix, for example, because the received signals may be combined in the analog domain prior to digital baseband due to an analog beamformer or phase shifter. Instead, in such cases, the receiver may only have access to the scalar output of the receive beamformer. Hence, it has been a challenging problem to devise an antenna selection method based on such a scalar only rather than the channel matrix.

Accordingly, new systems, methods, and media for selecting antennas and beamformers are desirable.

SUMMARY

Systems, methods, and media for selecting antennas and beamformers are provided. In some embodiments, systems for selecting antennas are provided, the systems comprising: at least one hardware processor that: (a) selects a current antenna subset of a plurality of transmit antennas and receive antennas; (b) receives signals in response to a transmission of pilot symbols using the current antenna subset; (c) determines a current objective function for the current antenna subset based on the signals received using the current antenna subset; (d) replaces an antenna in the current antenna subset with another antenna not in the current antenna subset to form a next antenna subset; (e) receives signals in response to a transmission of pilot symbols using the next antenna subset; (f) determines a next objective function for the current antenna subset based on the signals received using the next antenna subset; (g) determines whether the next objective function is better than the current objective function, and if so creates a next occupation probability vector entry having a value corresponding to the next antenna subset; and (h) determines whether the value for the next occupation probability vector entry is larger than a value for an optimal occupation probability vector entry, and if so sets the second antenna subset as the optimal antenna subset.

In some embodiments, methods for selecting antennas are provided, the methods comprising: (a) selecting a current antenna subset of a plurality of transmit antennas and receive antennas; (b) receiving signals in response to a transmission of pilot symbols using the current antenna subset; (c) determining a current objective function for the current antenna subset based on the signals received using the current antenna subset; (d) replacing an antenna in the current antenna subset with another antenna not in the current antenna subset to form a next antenna subset; (e) receiving signals in response to a transmission of pilot symbols if sing the next antenna subset; (f) determining a next objective function for the current antenna subset based on the signals received using the next antenna subset; (g) determining whether the next objective function is better than the current objective function, and if so creating a next occupation probability vector entry having a value corresponding to the next antenna subset; and (h) determining whether the value for the next occupation probability vector entry is larger than a value for an optimal occupation probability vector entry, and if so setting the second antenna subset as the optimal antenna subset.

In some embodiments, non-transitory computer-readable media containing computer-executable instructions that, when executed by a processor, cause the processor to perform a method for selecting antennas are provided, the method comprising: (a) selecting a current antenna subset of a plurality of transmit antennas and receive antennas; (b) receiving signals in response to a transmission of pilot symbols using the current antenna subset; (c) determining a current objective function for the current antenna subset based on the signals received using the current antenna subset; (d) replacing an antenna in the current antenna subset with another antenna not in the current antenna subset to form a next antenna subset; (e) receiving signals in response to a transmission of pilot symbols using the next antenna subset; (f) determining a next objective function for the current antenna subset based on the signals received using the next antenna subset; (g) determining whether the next objective function is better than the current objective function, and if so creating a next occupation probability vector entry having a value corresponding to the next antenna subset; and (h) determining whether the value for the next occupation probability vector entry is larger than a value for an optimal occupation, probability vector entry, and if so setting the second antenna subset as the optimal antenna subset.

DETAILED DESCRIPTION

By exploiting the strong line-of-sight property of high giga-Hertz channels, such as 60 GHz channels, an iterative antenna selection process based on discrete stochastic approximation, that can quickly lock onto a near-optimal antenna subset, can be provided. Moreover, given a selected antenna subset, an adaptive transmit and receive beamforming selection process based on the stochastic gradient method, that can make use of a low-rate feedback channel to inform the transmitter about the selected beams, can also be provided.

Figure 1:
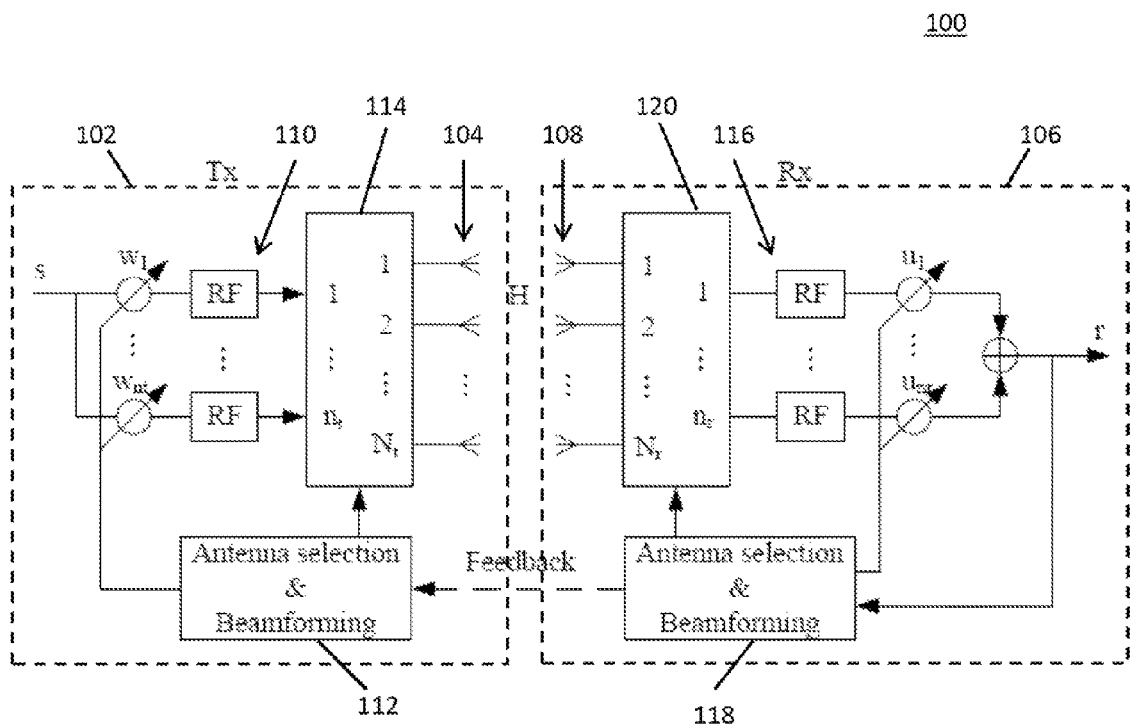
FIG. 1 is a diagram illustrating an example of hardware in accordance with some embodiments.

As shown in FIG. 1, in some embodiments, a MIMO system 100 with a transmitter 102 with $N_t$ (e.g., 32) transmit antennas 104 and a receiver 106 with $N_r$ (e.g., 10) receive antennas 108 can be provided. Transmitter 102 may also include RF chains 110, an antenna selection and beamforming controller 112, and an RF switch 114. Receiver 106 may also include RF chains 116, an antenna selection and beamforming controller 118, and an RF switch 120.

Antennas 104 and 108 can be any suitable antennas, such as antennas having an omni-directional antenna pattern and a 20 dBi gain and vertical linear polarization.

RF chains 110 and 116 may be any suitable RF chains, and may include any suitable components, such as amplifiers, AD/DA converters, mixers, etc. Any suitable number of RF chains 110 and 116, such as ten each, can be provided in some embodiments.

Antenna selection and beamforming controllers 112 and 118 may be any suitable logic, gate arrays, hardware processors, computers, etc, for performing any suitable portion of antenna selection and beamforming processes as described herein.

RF switches 114 and 118 may be any suitable devices for switching RF signals between selected antennas 104 and 108, respectively, and RF chains 110 and 116, respectively.

Although a transmitter 102 and a receiver 106 are illustrated in FIG. 1 for clarity, the transmitter and the receiver can be part of or operations of a transceiver that is also capable of receiving and transmitting, respectively in some embodiments. Such transceivers can be any suitable transceivers such as IEEE 802.15.3c or 802.11ad transceivers in some embodiments.

In some embodiments, when operating in certain high giga-Hertz frequency bands, such as the 60 GHz band, radio waves in such systems can propagate with strong line-of-sight (LOS) components as well as multi-cluster multipath components because of high path loss and inability of diffusion. Due to such near-optical propagation characteristics, a 3-D ray tracing technique can be used for channel modeling of these systems in some embodiments.

Figure 2:
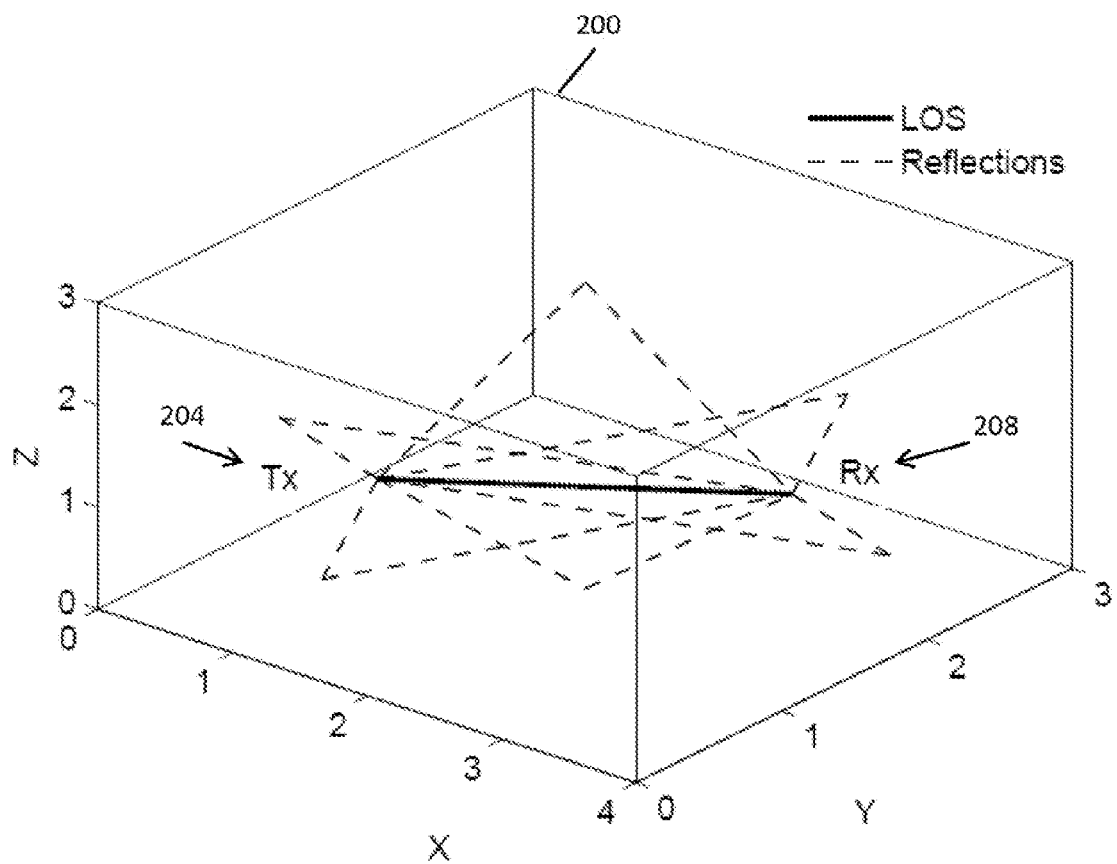
FIG. 2 is a diagram illustrating an example of line of sight (LOS) and non-LOS components in signal propagation in accordance with some embodiments.

For example, as shown in FIG. 2, when operating in a room 200, such a 3-D ray tracing technique can be illustrated. The transceivers in such an example can be located in any suitable locations within room 200. For each location, possible rays in the LOS path and up to the second order reflections from walls, ceiling and floor can be traced for the links between the transmit antennas 204 and the receive antennas 208. For example, the impulse response for one link can be given by the following equation (1):

$$h(t,\phi_{tx},\theta_{tx},\phi_{rx},\theta_{rx}) = \Sigma_i A^{(i)} C^{(i)}(t-T^{(i)}, \phi_{tx}-\Phi_{tx}^{(i)}, \theta_{tx}-\Theta_{tx}^{(i)}, \phi_{rx}-\Phi_{rx}^{(i)}, \theta_{rx}-\Theta_{rx}^{(i)}) \quad (1)$$

where $A^{(i)}, T^{(i)}, \Phi_{tx}^{(i)}, \Theta_{tx}^{(i)}, \Phi_{rx}^{(i)}, \Theta_{rx}^{(i)}$ are the inter-cluster parameters for the amplitude, the delay, the departure azimuth, the departure elevation, the arrival azimuth, and the arrival elevation, respectively, of ray cluster i, and $$C^{(i)}(t,\phi_{tx},\theta_{tx},\phi_{rx},\theta_{rx}) = \Sigma_k \alpha A^{(i)} C^{(i)}(t-\tau^{(i)}, \phi_{tx}-\Phi_{tx}^{(i)}, \theta_{tx}-\Theta_{tx}^{(i)}, \phi_{rx}-\Phi_{rx}^{(i)}, \theta_{rx}-\Theta_{rx}^{(i)}) \quad (2)$$

denotes the cluster constitution by rays therein, where $\alpha^{(i,k)}$, $\tau^{(i,k)}, \phi_{tx}^{(i,k)}, \theta_{tx}^{(i,k)}, \phi_{rx}^{(i,k)}, \theta_{rx}^{(i,k)}$ are the ultra-cluster parameters for $k^{th}$ ray in cluster i.

In an OFDM-based system, which can be used in some embodiments, the narrowband subchannels can be assumed to be flat-fading. In such cases, the equivalent channel matrix between the transmitter and the receiver can be given by $$H=[h_{ij}], \text{ with } h_{ij} = \Sigma_{l=1}^{N_{rays}} \alpha_{ij}^{(l)} \delta(t-\tau_0)|_{t=\tau_0} \quad (3)$$

for i=1, 2, . . . , $N_r$ and j=1, 2 . . . , $N_t$, where: the entry $h_{ij}$ denotes the channel response between transmitter j and receiver i by aggregating all $N_{rays}$ traced rays between them at the delay of the LOS component, $\tau_0$; and $\alpha_{ij}^{(l)}$ is the amplitude of lth ray in the corresponding link. Analytically, the channel matrix in (3) can be further separated into $H_{LOS}$ and $H_{NLOS}$ accounting for the LOS and non-LOS components, respectively $$H = \sqrt{\frac{1}{K+1}} H_{NLOS} + \sqrt{\frac{K}{K+1}} H_{LOS} \quad (4)$$

where the Rician K-factor indicates the relative strength of the LOS component.

In some embodiments, the numbers of available transmit and receive antennas, $N_t$ and $N_r$, can be large and the numbers of available radio-frequency (RF) chains at the transmitter and receiver, $n_t$ and $n_r$, can be such that $n_t \ll N_t$ and/or $n_r \ll N_r$. Accordingly, mechanisms for selecting a subset of $n_t \times n_r$ transmit and receive antennas out of the available $N_t \times N_r$ antennas in a MIMO system can be provided.

In such mechanisms, $\omega$ can be used to denote the set of indices corresponding to the selected $n_t$ transmit antennas and $n_r$ receive antennas, and $H_\omega$ can be used to denote the submatrix of the original MIMO channel matrix H corresponding to die selected antennas. For data transmission over a chosen MIMO system $H_\omega$, transmit beamformer $w=[w_1, w_2, \ldots, w_{n_t}]^T$, with $\|w\|=1$, can be used in some embodiments. The received signal can then be given by:

$$r = \sqrt{\rho} H_\omega w s + n \quad (5)$$

where: s is the transmitted data symbol;

$$\rho = \frac{E_s}{n_t N_0}$$

is the system signal-to-noise ratio (SNR) at each receive antenna; $E_s$ and $N_0$ are the symbol energy and noise power density, respectively; and $n \sim \mathcal{CN}(0,I)$ is an additive white Gaussian noise vector. At the receiver, a receive beamformer $u=[u_1, u_2, \ldots, u_{n_r}]^T$, with $\|u\|=1$, can be applied to the received signal r, to obtain:

$$y(\omega,w,u)=u^H r=\sqrt{\rho}u^H H_\omega ws+u^H n. \quad (6)$$

For a given antenna subset ω and known channel matrix $H_\omega$, the optimal transmit beamformer w and receive beamformer u, in the sense of maximum received SNR, can be given respectively by the right and left singular vectors of $H_\omega$ corresponding to the principal singular value $\sigma_1(H_\omega)$. The optimal antenna subset $\hat{\omega}$ can then be given by the antennas whose corresponding channel submatrix has the largest principal singular value as "follows".

$$\hat{\omega}=\arg\max_{w\in S}\sigma_1(H_w) \quad (7)$$

where S is a set different combinations of $n_t$ transmit antennas and $n_r$ receive antennas.

In accordance with some embodiments, a discrete stochastic approximation algorithm process can be used to perform antenna selection to find $\hat{\omega}$. By setting the transmit and receive beam formers to some specific values, this process can compute a bound on the principal singular value of $H_\omega$ corresponding to the current antenna subset ω, and then iteratively update ω until it converges. Once the antenna subset ω has been selected, the transmit and receive beamformers w and u can be updated using a stochastic gradient algorithm process in some embodiments. At each iteration of this process, feedback bits can be transmitted from the receiver to the transmitter via a feedback channel to inform the transmitter about the updated transmit beamformer.

In some embodiments, a function $\phi(\cdot)$ of $y(\omega,w,u)$ that is an unbiased estimate of $\sigma_1(H_\omega)$ can be used to solve for $\hat{\omega}$ as follows:

$$\hat{\omega}=\arg\max_{\omega\in S}\mathbb{E}\{\phi(y(\omega,w,u))\} \quad (8)$$

In accordance with some embodiments, a stochastic approximation process can be used to solve equation (8). In some embodiments of this process, a sequence of estimates of the optimal antenna subset can be generated, where each new estimate is based on the previous one by moving a small step in a good direction towards the global optimizer. Through iterations of the process, the global optimizer can be found by means of maintaining an occupation probability vector π, which indicates an estimate of the occupation probability of one state (i.e., antenna subset). Under certain conditions, such an algorithm converges to the state which has the largest occupation probability in π.

Figure 3:
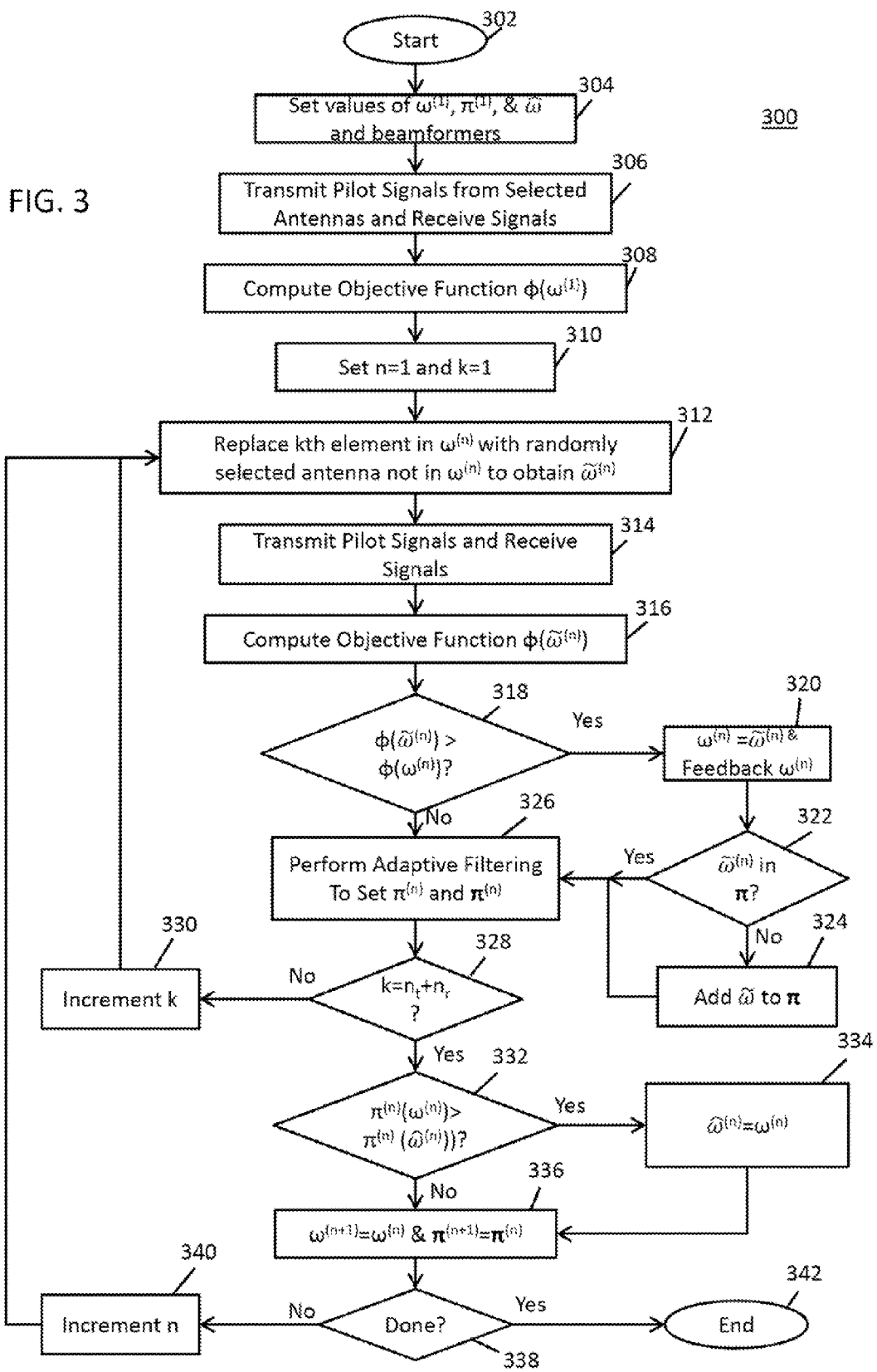
FIG. 3 is a diagram illustrating an example of a process for selecting antennas in accordance with some embodiments.

An example 300 of such a process in accordance with some embodiments is shown in FIG. 3. In some embodiment, this process can be controlled by a hardware processor in a receiver (such as in controller 118 of FIG. 1) and the actions of a remote transmitter can controlled and synchronized via any suitable feedback.

As illustrated, after process 300 begins at 302, at 304, the process can set initial values for antenna subset $\omega^{(1)}$, can set the occupation probability vector $\pi^{(1)}=[\omega^{(1)},1]^T$ (which can have only one element with the first entry serving as the index of the antenna subset, and the other entry indicating the corresponding occupation probability), can set the optimal antenna subset $\hat{\omega}=\omega^{(1)}$, and can set the transmit beamformer (w) and receive beamformer (u) as follows:

$$w=e_k, \text{ and } u=\frac{1}{\sqrt{n_r}}1, \quad (9)$$

where $e_k$ is a length-$n_t$ column, vector of all zeros, except for the k-th entry which is one; and 1 is a length-$n_r$ column vector of all ones. The initial set of transmit antennas can be fed back to the transmitter via a feedback signal at 304 in some embodiments.

Next, at 306, M (e.g., 20) pilot signals (which can be set as s=1) can be transmitted from the selected transmit antennas and signals $\{y(k)^{(m)}, m=1,\ldots,M; k=1,\ldots,n_t+n_r\}$ received via the selected receive antennas.

Then, at 308, the objective function $\phi(\omega^{(1)})$ for the initial antenna subset can be calculated. This objective function can be calculated in any suitable way. For example, in some embodiments, the objective function $\phi(\omega^{(1)})$ can be estimated as being:

$$\phi(\omega^{(1)})\approx\tilde{B}_2\triangleq\frac{1}{n_t}\sum_{k=1}^{n_t}\tilde{\beta}(k) \quad (10)$$

wherein $$\tilde{\beta}(k)\triangleq \quad (11)$$

$$\frac{1}{M}\left\{\begin{array}{l}[y(k)^{(1)H}y(k)^{(2)}+y(k)^{(2)H}y(k)^{(3)}+\ldots+y(k)^{(M)H}y(k)^{(1)}]+\\ \sum_{\ell=1,\ell\neq k}^{n_t}\left|\sum_{m=1}^{M}y(k)^{(m)H}y(\ell)^{(m)}\right|\end{array}\right\}$$

At 310, iteration and sub-iteration counters n and k, respectively, can both be set to one, and then at 312 the kth element in ω(n) can be replaced with a randomly selected antenna not in $\omega^{(n)}$ to obtain $\tilde{\omega}^{(n)}$.

Pilot signals can then be transmitted and the signal received at 314. If the new, randomly selected antenna is a transmit antenna, this can be achieved by feeding back the identity of the new transmit antenna to the transmitter, causing the transmitter to transmit pilot signals from the new antenna, and obtaining the received signals $\{y(k)^{(m)}, m=1,\ldots,M\}$ at the receiver. If the new, randomly selected antenna is a receive antenna, this can be achieved by instructing the transmitter to sequentially transmit pilot signals from all transmit antennas, and obtaining the received signals.

Next, at 316, the objective function $\phi(\tilde{\omega}^{(n)})$ for the current antenna subset can be calculated. This objective function can be calculated in any suitable way, such as described above, in some embodiments.

Then, at 318, the objective functions of $\omega^{(n)}$ and $\tilde{\omega}^{(n)}$ can be compared, and if the objective function for $\tilde{\omega}^{(n)}$ is better than the objective function for $\omega^{(n)}$, then: $\omega^{(n)}$ can be set equal to $\tilde{\omega}^{(n)}$ and $\omega^{(n)}$ can be fed back to the transmitter (if any transmit antennas affected) at 320; and it can be determined at 322 if $\tilde{\omega}^{(n)}$ is in π, and, if not, a column $[\tilde{\omega}^{(n)},0]^T$ can be added to π at 324.

If it is determined at 318 that the objective function for $\tilde{\omega}^{(n)}$ is not better than the objective function for $\omega^{(n)}$, or after determining that $\tilde{\omega}^{(n)}$ is in π or completing 324, process 300 can perform adaptive filtering to set $\pi^{(n)}$ and $\pi^{(n)}$ at 326. This can be perforated in any suitable manner. For example, in some embodiments, a forgetting factor $\mu(n-1)=1/(n+1)$ can be set, $\pi^{(n)}$ can be set equal to $[1-\mu(n+1)]\pi^{(n)}$, and $\pi^{(n)}(\omega^{(n)})$ can be set equal to $\pi^{(n)}(\omega^{(n)})+\mu(n+1)$.

At 328, it can be determined if $k=n_t+n_r$, and, if not, k can be incremented at 330 and process 300 can loop back to 312. Otherwise, at 332, process 300 can next determine if $\pi^{(n)}(\omega^{(n)})$ is greater than $\pi^{(n)}(\hat{\omega}^{(n)})$, and, if so, set $\hat{\omega}^{(n)}$ equal to $\omega^{(n)}$ at 334.

If it is determined at 332 that $\pi^{(n)}(\omega^{(n)})$ is not greater than $\pi^{(n)}(\hat{\omega}^{(n)})$, or after completing 334, then process 300 can set $\omega^{(n+1)}$ equal to $\omega^{(n)}$ and $\pi^{(n+1)}$ equal to $\pi^{(n)}$ at 336.

Then, at 338, process 300 can determine whether the process is done. If not, the process can then increment n at 340 and loop back to 312. Otherwise, the process can terminate at 342. The process can determine if it is done in any suitable manner. For example, in some embodiments, process 300 can be done when n reaches a given number, such as 100 for example. Once done, the last selected subset can be considered to be the global (sub)optimizer.

In some embodiments, rather than using only one receive beamformer $$u = \frac{1}{\sqrt{n_r}} \mathbf{1}$$

as described above, r receive beamformers $\{u_1, \ldots, u_r\}$ (which are columns of a $n_r \times n_r$ unitary matrix) can be used for each transmit beamformer $e_k$, $k=1, \ldots, n_t$. Using such beamformers, an approximation of the objective function can be given by:

$$\phi(\omega^{(1)}) \approx \frac{1}{n_t \sqrt{\min\{r, n_t\}}} F\left(\sum_{j=1}^{r} y(\omega, u_j)^H y(\omega, u_j)\right), \quad (12)$$

or its smoother version $$\phi(\omega^{(1)}) \approx \frac{1}{n_t \sqrt{\min\{r, n_t\}}} \sum_{k=1}^{n_t} \tilde{\gamma}(k) \quad (13)$$

where $$\tilde{\gamma}(k) \triangleq \frac{1}{m} \left\{ \sum_{j=1}^{r} \begin{bmatrix} y(\omega, e_k, u_j)^{(1)H} y(\omega, e_k, u_j)^{(2)} + \ldots + \\ y(\omega, e_k, u_j)^{(M)H} y(\omega, e_k, u_j)^{(1)} \end{bmatrix} + \right.$$
$$\left. \sum_{\ell=1, \ell \neq k}^{n_t} \left| \sum_{j=1}^{r} \sum_{m=1}^{M} y(\omega, e_k, u_j)^{(m)H} y(\omega, e_\ell, u_j)^{(m)} \right| \right\} \quad (14)$$

and $$y(\omega, u_j) = [y(\omega, e_1, u_j), \ldots, y(\omega, e_{n_t}, u_j)], j = 1, \ldots, r.$$

Once the antenna subset $H_\omega$ has been chosen, the transmit and receive beamformers w and u can be computed in some embodiments, w and u can be chosen to maximize the received SNR, or alternatively, to maximize the power of the receive beamformer output in (6), $|y(\omega, w, u)|^2$, i.e.:

$$(\hat{w}, \hat{u}) = \arg\max_{w \in C^{n_t}, \|w\|=1; u \in C^{n_r}, \|u\|=1} |y(\omega, w, u)|^2. \quad (15)$$

Figure 4:
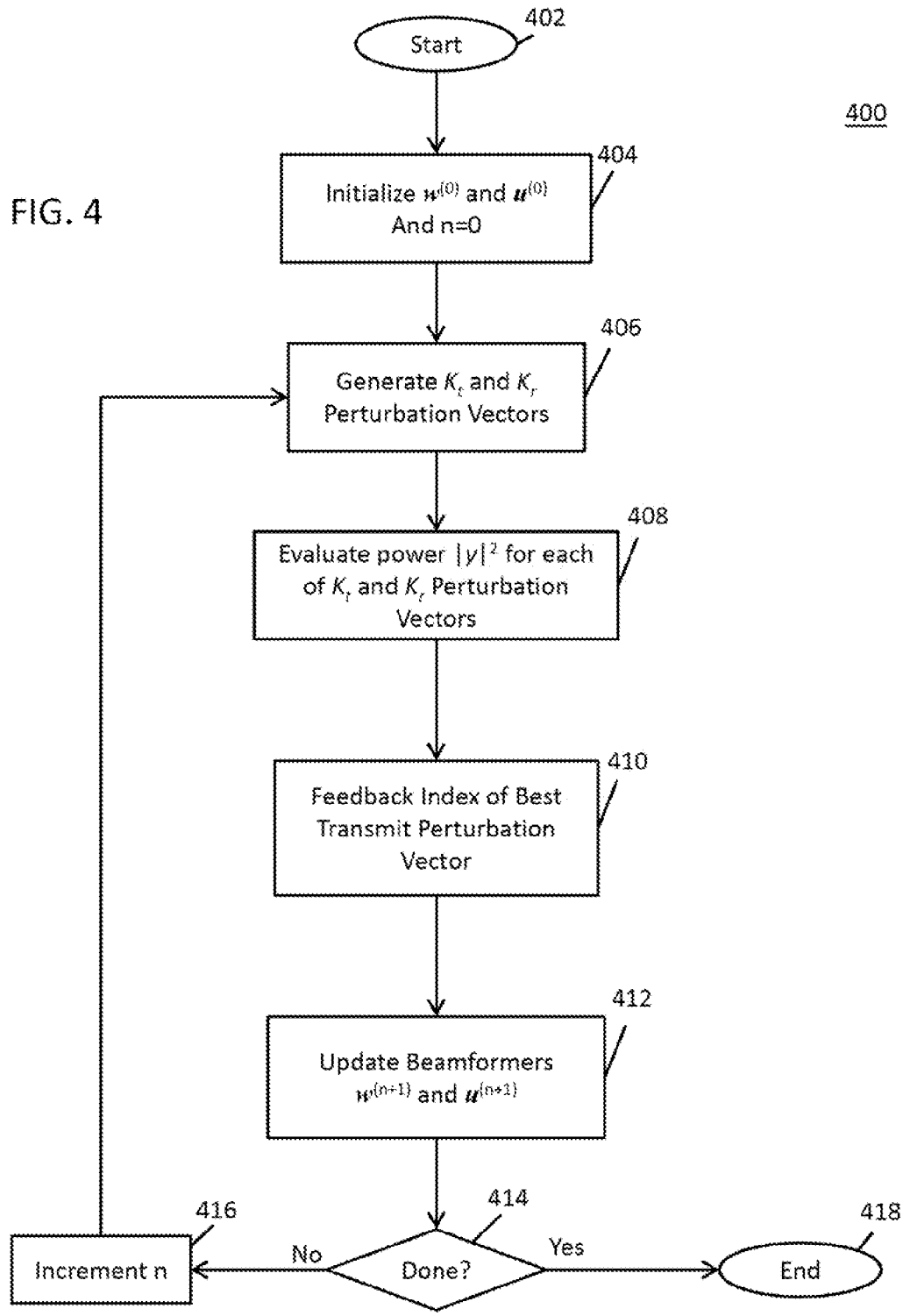
FIG. 4 is a diagram illustrating an example of a process for selecting beam formers in accordance with some embodiments.

In accordance with some embodiments, a stochastic gradient method process can be used for updating the beamformers. An example 400 of such a process in accordance with some embodiments is shown in FIG. 4.

As illustrated, after process 400 begins at 402, beamformers $w^{(0)}$ and $u^{(0)}$ can be initialized and iteration counter n can be set to zero at 404.

Any suitable initial beamformers w and u can be used in some embodiments. For example, in some embodiments, these initial beamformers can be randomly selected. As another example, in some embodiments, a non-random initialization can be used to speed up the convergence of process 400. Because the channel can consist of a deterministic LOS component $H_{LOS}$ and a random component, when the K factor is high, the LOS component mostly determines die largest singular mode. Hence, the transmit and receive beamformers can be initialized as the right and left singular vectors of $H_{LOS}$, respectively, in some embodiments.

Next, at 406, given a set of current beamformers (w,u), $K_t$ perturbation vectors can be generated for the transmit beamformer, $p_j \sim CN(0,I)$, $j=1, \ldots, K_t$, and $K_r$ perturbation vectors can be generated for the receive beamformer, $q_i \sim CN(0, I)$, $i=1, \ldots, K_r$. Then for each of the normalized perturbed transmit-receive beamformer pairs:

$$\left( \frac{w + \beta p_j}{\|w + \beta p_j\|}, \frac{u + \beta q_i}{\|u + \beta q_i\|} \right), \quad (16)$$

where $\beta$ is a step-size parameter, the corresponding received output power $|y|^2$ can be measured and the effective channel gain $|u^H H_\omega w|^2$ can be used as a performance metric independent of transmit power at 408. The transmitter can then be informed at 410 of the selected perturbation vector by a $\lceil \log K_t \rceil$-bit feedback message from the receiver. Then, at 412, the beamformers can be updated using the perturbation vector pair that gives the largest output power at the receiver.

At 414, process 400 can determine if it is done, and if not, the process can branch to 416 to increment n and then loop back to 406. Otherwise, process 400 can terminate at 418. Process 400 can determine whether it is done in any suitable manner. For example, in some embodiments, the process can be determined as being done when the effective channel gain $|u^H H_\omega w|^2$ fluctuates below a tolerance threshold.

In some embodiments, instead of switching to different receive beamformers and making $K_t K_r$ transmissions, $K_r$ parallel receiver beamformers can be set up to obtain $K_r$ receiver outputs simultaneously and only $K_t$ transmissions performed for each iteration.

In some embodiments, rather than generating all candidate $K_t + K_r$ beamformers anew at each iteration, the best transmit and receive beamformers from the previous iteration can be kept and $K_t - 1$ new transmit beamformers and $K_r - 1$ new receive beamformers can be generated for the current iteration.

In some embodiments, an obstacle can block a LOS signal and therefore attenuate the received power corresponding to that signal. A metric of diffraction ratio matrix (DRM) can be used in some embodiments to model the blockage impact to an entire antenna array from a wave propagation point of view. More particularly, the metric diffraction ratio can be used to indicate the blockage impact on a single radio link as follows:

$$d_{ij} = \frac{|E_{ij}|}{|E_{ij,FS}|}, i = 1, \ldots, N_r, j = 1, \ldots, N_t \quad (17)$$

where:

$E_{ij}$ is the incident electric at the i receive antenna from the j transmit antenna as:

$$E_{ij} = \frac{E_0}{r} e^{-j\beta r},$$

where $E_0$ is the electric at the jth transmit antenna, r is the distance between antennas i and j, $$\beta = \frac{2\pi}{\lambda},$$

and $E_{ij}$ can be computer using Huygen's law iteratively upon each obstacle plane; and $E_{ij,FS}$ is the incident electric at the i receive antenna from the j transmit antenna in free space.

The obstacle impact alters the wireless channel matrix by means of DRM, namely $D=\{d_{ij}\}$, such that $$H_{BLK}=H_{LOS}\circ D+H_{NLOS} \quad (18)$$

where ○ is Hadamard product operator.

In some embodiments, when an obstacle blocks the LOS transmission from the transmitter to the receiver, a backup antenna subset can be chosen as a substitution for the primary antenna subset which may be attenuated by the obstacle.

When the obstacle is detected and the primary antenna subset is blocked, members in the antenna subset selection history can be re-evaluated, using a scoring function and the member with highest score can be chosen as the backup antenna subset.

In some embodiments, a scoring function can be set as:

$$S(\omega,D)=J(\omega)e^{(\|D_\omega\|_F^2-n_t n_r)} \quad (19)$$

where:

$J(\omega)$ is the objective function with respect to the antenna subset ω in free space channel; and $D_\omega$ is a sub-matrix of D whose entries are selected by the indices in antenna subset ω.

Figure 5:
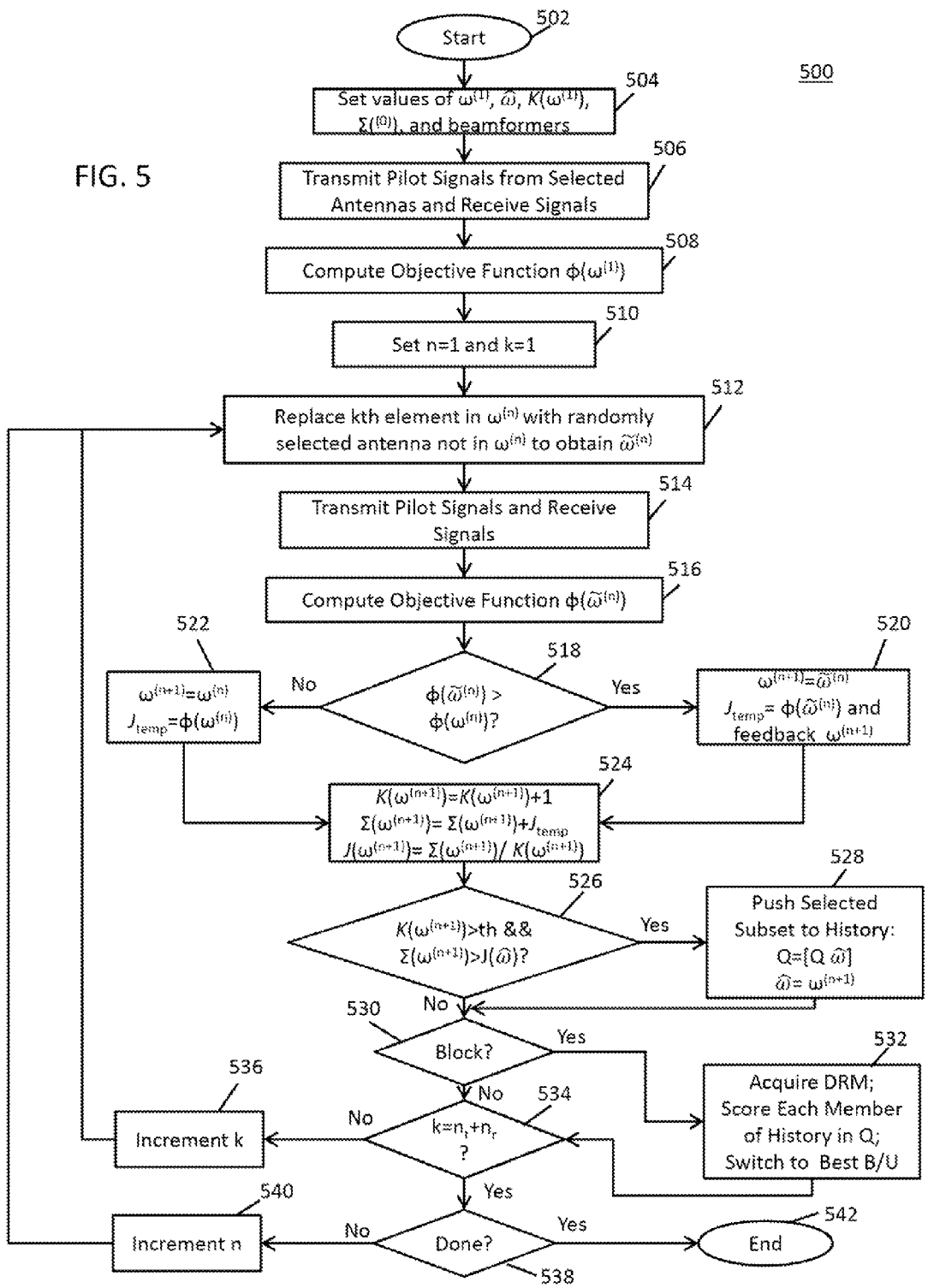
FIG. 5 is a diagram illustrating an example of a process for selecting backup antennas in accordance with some embodiments.

An example 500 of a process for selecting a backup antenna subset in accordance with some embodiments is shown in FIG. 5. In some embodiment, this process can be controlled by a hardware processor in a receiver and the actions of a remote transmitter can controlled and synchronized via any suitable feedback.

As illustrated, after process 500 begins at 502, at 504, the process can set initial values for antenna subset $\omega^{(1)}$, can set the optimal antenna subset $\hat{\omega}=\omega^{(1)}$, can set the number of visits $K(\omega^{(1)})=1$, can set the cumulated objective function $\Sigma(\omega^{(1)})=0$, and can set the transmit beamformer (w) and receive beamformer (u) as follows:

$$w = e_k, \text{ and } u = \frac{1}{\sqrt{n_r}}1, \quad (20)$$

where $e_k$ is a length-$n_t$ column vector of all zeros, except for the k-th entry which is one; and 1 is a length-$n_r$ column vector of all ones. The initial set of transmit antennas can be fed back to the transmitter via a feedback signal at 504 in some embodiments.

Next, at 506, M (e.g., 20) pilot signals (which can be set as s=1) can be transmitted from the selected transmit antennas and signals $\{y(k)^{(m)}, m=1, \ldots, M; k=1, \ldots, n_t+n_r\}$ received via the selected receive antennas.

Then, at 508, the objective function $\phi(\omega^{(1)})$ for the initial antenna subset can be calculated. This objective function can be calculated in any suitable way. For example, in some embodiments, the objective function $\phi(\omega^{(1)})$ can be estimated as being:

$$\phi(\omega^{(1)}) \approx \tilde{B}_2 \triangleq \frac{1}{n_t}\sum_{k=1}^{n_t}\tilde{\beta}(k) \quad (21)$$

wherein $$\tilde{\beta}(k) \triangleq \quad (22)$$

$$\frac{1}{M}\left\{ \begin{array}{c} [y(k)^{(1)H}y(k)^{(2)}+y(k)^{(2)H}y(k)^{(3)}+\ldots+y(k)^{(M)H}y(k)^{(1)}] + \\ \sum_{\ell=1,\ell\neq k}^{n_t}\left|\sum_{m=1}^{M}y(k)^{(m)H}y(\ell)^{(m)}\right| \end{array} \right\}$$

At 510, iteration and sub-iteration counters n and k, respectively, can both be set to one, and then at 512 the kth element in ω(n) can be replaced with a randomly selected antenna not in $\omega^{(n)}$ to obtain $\tilde{\omega}^{(n)}$. Pilot signals can then be transmitted and the signal received at 514. If the new, randomly selected antenna is a transmit antenna, this can be achieved by feeding back the identity of the new transmit antenna to the transmitter, causing the transmitter to transmit pilot-signals from the new antenna, and obtaining the received signals $\{y(k)^{(m)}, m=1, \ldots, M\}$ at the receiver. If the new, randomly selected antenna is a receive antenna, this can be achieved by instructing the transmitter to sequentially transmit pilot signals from all transmit antennas, and obtaining the received signals.

Next, at 516, the objective function $\phi(\tilde{\omega}^{(n)})$ for the current antenna subset can be calculated. This objective function can be calculated in any suitable way, such as described above, in some embodiments.

Then, at 518, the objective functions of $\omega^{(n)}$ and $\tilde{\omega}^{(n)}$ can be compared, and if the objective function for $\tilde{\omega}^{(n)}$ is better than the objective function for $\omega^{(n)}$, then $\omega^{(n+1)}$ can be set equal to $\tilde{\omega}^{(n)}$, $J_{temp}$ can be set equal to the objective function of $\tilde{\omega}^{(n)}$, and $\omega^{(n)}$ can be fed back to the transmitter (if any transmit antennas affected) at 520.

Otherwise, if it is determined at 518 that the objective function for $\tilde{\omega}^{(n)}$ is not better than the objective function for $\omega^{(n)}$, then, at 522, $\omega^{(n+1)}$ can be set equal to $\omega^{(n)}$, and $J_{temp}$ can be set equal to the objective function of $\omega^{(n)}$.

Next, at 524, process 500 can increment the number of visits $(K(\omega^{(n+1)})=K(\omega^{(n+1)})+1)$, can cumulate the objective function $(\Sigma(\omega^{(n+1)})=\Sigma(\omega^{(n+1)})+J_{temp})$, and can calculate the average objective function $(J(\omega^{(n+1)})=\Sigma(\omega^{(n+1)})/K(\omega^{(n+1)}))$.

Then at 526, the process can determine whether the number of visits $(K(\omega^{(n+1)}))$ is greater than th, the minimum number of visits that are reliable, AND whether the cumulated objective function $(\Sigma(\omega^{(n+1)}))$ is greater than $J(\hat{\omega})$, the objective function of the optimal antenna subset. If so, then process 500 can push the selected subset to history as $Q=[Q\ \hat{\omega}]$ and $\hat{\omega}=\omega^{(n+1)}$.

If it is determined at 526 that $K(\omega^{(n+1)})<=$th OR $\Sigma(\omega^{(n+1)})>=J(\hat{\omega})$, or after completing 528, process 500 can determined if a transmission is blocked at 530. This determination can be made in any suitable manner. For example, this determination can be made if the received transmission power significantly drops over a short period of time. If it is determined at 530 that the transmitter is blocked, then at 532, process 500 can acquire DRM D using (17), score each member of the history in Q using the scoring function (19), and switch to the backup with the highest score if the current antenna subset is significantly attenuated.

If it is determined at 530 that the transmitter is not blocked or after completing 532, then at 534, process 500 can determine if $k=n_t+n_r$. If not, process 500 can branch to 536, where k can be incremented and then can loop back to 512. Otherwise, at 538, process 500 can determine whether the process is done. If not, the process can then increment n at 540 and loop back to 512. Otherwise, the process can terminate at 542. The process can determine if it is done in any suitable manner. For example, in some embodiments, process 500 can be done when n reaches a given number, such as 100 for example.

The mechanisms and processes described herein for selecting antennas and beamformers can be implemented in any suitable hardware that is part of or connected to a receiver and/or a transmitter, such as controllers 112 and 118 (FIG. 1), in some embodiments. For example, these mechanisms and/or processes can be implemented in any of a general purpose device such as a computer or a special purpose device such as dedicated logic, a gate array, a client, a server, mobile terminal (e.g., mobile phone), etc. Any of these general or special purpose devices can include any suitable components such as a hardware processor (which, can be a microprocessor, digital signal processor, a controller, etc.), memory, communication interfaces, display controllers, input devices, etc.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as Hash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments cars be combined and rearranged in various ways.

What is claimed is:

1. A system for selecting antennas comprising:
at least one hardware processor that:
  (a) selects a current antenna subset consisting of at least one selected transmit antenna and at least one selected receive antenna from a set of available antennas including a plurality of available transmit antennas and a plurality of available receive antennas, wherein the number of antennas in the current antenna subset is less than the number of antennas in the set of available antennas;
  (b) causes each of the at least one selected transmit antenna in the current antenna subset to be coupled to one of at least one transmitter RF chain;
  (c) causes each of the at least one selected receive antenna in the current antenna subset to be coupled to one of at least one receiver RF chain;
  (d) receives first signals in response to a first transmission of pilot symbols using the current antenna subset;
  (e) determines a current objective function for the current antenna subset based on the signals received using the current antenna subset;
  (f) replaces an antenna in the current antenna subset with another antenna not in the current antenna subset from the set of available antennas to form a next antenna subset;
  (g) causes each of the at least one selected transmit antenna in the next antenna subset to be coupled to one of the at least one transmitter RF chain;
  (h) causes each of the at least one selected receive antenna in the next antenna subset to be coupled to one of the at least one receiver RF chain;
  (i) receives second signals in response to a second transmission of pilot symbols using the next antenna subset;
  (j) determines a next objective function for the current antenna subset based on the second signals received using the next antenna subset;
  (k) determines whether the next objective function is better than the current objective function, and if so creates a next occupation probability vector entry having a value corresponding to the next antenna subset; and
  (l) determines whether the value for the next occupation probability vector entry is larger than a value for an optimal occupation probability vector entry, and if so sets the second antenna subset as the optimal antenna subset;
  (m) iteratively selects a transmit beamformer and a receive beamformer by applying perturbation vectors to the transmit beamformer and the receive beamformer and evaluates power received using the transmit beamformer as perturbed and the receive beamformer as perturbed.

2. The system of claim 1, wherein the at least one hardware processor also:
designates the next antenna subset as the current antenna subset;
designates the next objective function as the current objective function; and
repeats (f)-(l).

3. The system of claim 1, wherein the at least one selected transmit antenna is $n_t$ transmit antenna(s), wherein $n_t$ is a positive integer and wherein the at least one hardware processor also selects a transmit beamformer that is used to transmit pilot symbols that is equal to a length $n_t$ column vector of all zeros except for a $k^{th}$ entry which is one, wherein k is a positive integer.

4. The system of claim 1, wherein the at least one selected receive antenna is $n_r$ receive antenna(s), wherein $n_r$ is a positive integer, and wherein the at least one hardware processor also selects a receive beamformer that is used to receive pilot symbols that is equal to a length $n_r$ column vector of all ones divided by the square root of $n_r$.

5. The system of claim 1, wherein the signals received using the current antenna subset are scalar values output from a receive beamformer.

6. A method for selecting antennas comprising:
  (a) selecting a current antenna subset consisting of at least one selected transmit antenna and at least one selected receive antenna from a set of available antennas including a plurality of available transmit antennas and a plurality of available receive antennas, wherein the number of antennas in the current antenna subset is less than the number of antennas in the set of available antennas;

(b) causing each of the at least one selected transmit antenna in the current antenna subset to be coupled to one of at least one transmitter RF chain;

(c) causing each of the at least one selected receive antenna in the current antenna subset to be coupled to one of at least one receiver RF chain;

(d) receiving first signals in response to a first transmission of pilot symbols using the current antenna subset;

(e) determining a current objective function for the current antenna subset based on the signals received using the current antenna subset;

(f) replacing an antenna in the current antenna subset with another antenna not in the current antenna subset from the set of available antennas to form a next antenna subset;

(g) causing each of the at least one selected transmit antenna in the next antenna subset to be coupled to one of the at least one transmitter RF chain;

(h) causing each of the at least one selected receive antenna in the next antenna subset to be coupled to one of the at least one receiver RF chain;

(i) receiving second signals in response to a second transmission of pilot symbols using the next antenna subset;

(j) determining a next objective function for the current antenna subset based on the second signals received using the next antenna subset;

(k) determining whether the next objective function is better than the current objective function, and if so creating a next occupation probability vector entry having a value corresponding to the next antenna subset; and (l) determining whether the value for the next occupation probability vector entry is larger than a value for an optimal occupation probability vector entry, and if so setting the second antenna subset as the optimal antenna subset;

(m) iteratively selecting a transmit beamformer and a receive beamformer by applying perturbation vectors to the transmit beamformer and the receive beamformer and evaluating power received using the transmit beamformer as perturbed and the receive beamformer as perturbed.

7. The method of claim 6, further comprising:
designating the next antenna subset as the current antenna subset;
designating the next objective function as the current objective function; and
repeating (f)-(l).

8. The method of claim 6, wherein the at least one selected transmit antenna is $n_t$ transmit antenna(s) and wherein $n_t$ is a positive integer, further comprising selecting a transmit beamformer that is used to transmit pilot symbols that is equal to a length $n_t$ column vector of all zeros except for a $k^{th}$ entry which is one, wherein k is a positive integer.

9. The method of claim 6, wherein the at least one selected receive antenna is $n_r$ receive antenna(s) and wherein $n_r$ is a positive integer, further comprising selecting a receive beamformer that is used to receive pilot symbols that is equal to a length $n_r$ column vector of all ones divided by the square root of $n_r$.

10. The method of claim 6, wherein the signals received using the current antenna subset are scalar values output from a receive beamformer.

11. A non-transitory computer-readable medium containing computer-executable instructions that, when executed by a processor, cause the processor to perform a method for selecting antennas, the method comprising:

(a) selecting a current antenna subset consisting of at least one selected transmit antenna and at least one selected receive antenna from a set of available antennas including a plurality of available transmit antennas and a plurality of available receive antennas, wherein the number of antennas in the current antenna subset is less than the number of antennas in the set of available antennas;

(b) causing each of the at least one selected transmit antenna in the current antenna subset to be coupled to one of at least one transmitter RF chain;

(c) causing each of the at least one selected receive antenna in the current antenna subset to be coupled to one of at least one receiver RF chain;

(d) receiving first signals in response to a first transmission of pilot symbols using the current antenna subset;

(e) determining a current objective function for the current antenna subset based on the signals received using the current antenna subset;

(f) replacing an antenna in the current antenna subset with another antenna not in the current antenna subset from the set of available antennas to form a next antenna subset;

(g) causing each of the at least one selected transmit antenna in the next antenna subset to be coupled to one of the at least one transmitter RF chain;

(h) causing each of the at least one selected receive antenna in the next antenna subset to be coupled to one of the at least one receiver RF chain;

(i) receiving second signals in response to second transmission of pilot symbols using the next antenna subset;

(j) determining a next objective function for the current antenna subset based on the second signals received using the next antenna subset;

(k) determining whether the next objective function is better than the current objective function, and if so creating a next occupation probability vector entry having a value corresponding to the next antenna subset; and (l) determining whether the value for the next occupation probability vector entry is larger than a value for an optimal occupation probability vector entry, and if so setting the second antenna subset as the optimal antenna subset;

(m) iteratively selecting a transmit beamformer and a receive beamformer by applying perturbation vectors to the transmit beamformer and the receive beamformer and evaluating power received using the transmit beamformer as perturbed and the receive beamformer as perturbed.

12. The non-transitory computer-readable medium of claim 11, wherein the method further comprises:
designating the next antenna subset as the current antenna subset;
designating the next objective function as the current objective function; and
repeating (f)-(l).

13. The non-transitory computer-readable medium of claim 11, wherein the at least one selected transmit antenna is $n_t$ transmit antenna(s), wherein $n_t$ is a positive integer, and wherein the method further comprises selecting a transmit beamformer that is used to transmit pilot symbols that is equal to a length $n_t$ column vector of all zeros except for a $k^{th}$ entry which is one, wherein k is a positive integer.

14. The non-transitory computer-readable medium of claim 11, wherein the at least one selected receive antenna is $n_r$ receive antenna(s), wherein $n_r$ is a positive integer, and wherein the method further comprises selecting a receive beamformer that is used to receive pilot symbols that is equal to a length $n_r$ column vector of all ones divided by the square root of $n_r$.

15. The non-transitory computer-readable medium of claim 11, wherein the signals received using the current antenna subset are scalar values output from a receive beamformer.

* * * * *